United States Patent [19]
Miller et al.

[11] Patent Number: 5,958,541
[45] Date of Patent: Sep. 28, 1999

[54] INFORMATION STORAGE MEDIA AND METHOD

[75] Inventors: Steven D. Miller; George W. Endres, both of Richland, Wash.

[73] Assignee: Battelle Memorial Institute, Richland, Wash.

[21] Appl. No.: 08/671,908

[22] Filed: Jun. 28, 1996

[51] Int. Cl.⁶ .................................................. B32B 3/00
[52] U.S. Cl. .................. 428/64.1; 428/64.2; 428/690; 428/945; 430/139; 430/321; 430/495.1; 430/945; 365/111
[58] Field of Search .................. 428/64.1, 64.2, 428/64.4, 690, 945; 430/1, 2, 20, 139, 321, 495.1, 945; 365/110, 111, 121

[56] References Cited

U.S. PATENT DOCUMENTS

| | | | |
|---|---|---|---|
| 5,007,037 | 4/1991 | Lindmayer | 369/100 |
| 5,028,794 | 7/1991 | Miller | 250/484 |
| 5,399,451 | 3/1995 | Hashida et al. | 430/19 |
| 5,581,499 | 12/1996 | Hamamdjian | 365/106 |

FOREIGN PATENT DOCUMENTS

| | | | |
|---|---|---|---|
| 0 354 601 | 2/1990 | European Pat. Off. | G11B 7/24 |
| 0 581 066 | 2/1994 | European Pat. Off. | G11B 7/24 |

OTHER PUBLICATIONS

Mokienko, I. Yu. et al. "Optical Storage Media Based on Doped Fluorite Crystals" vol. 71, No. 1, Jul. 1, 1991, pp. 44–46.

*Primary Examiner*—Elizabeth Evans
*Attorney, Agent, or Firm*—Douglas E. McKinley, Jr.; Paul W. Zimmerman

[57] ABSTRACT

Disclosed is a method for storing and retrieving information. More specifically, the present invention is a method for forming predetermined patterns, or data structures, using materials which exhibit enhanced absorption of light at certain wavelengths or, when interrogated with a light having a first wavelength, provide a luminescent response at a second wavelength. These materials may exhibit this response to light inherently, or may be made to exhibit this response by treating the materials with ionizing radiation.

67 Claims, 7 Drawing Sheets

INFORMATION STORAGE MEDIA AND METHOD

This invention is made with Government support under Contract DE-AC06-76RLO 1830, awarded by the U.S. Department of Energy. The Government has certain rights in the invention.

FIELD OF THE INVENTION

The present invention relates generally to a means and method for storing and retrieving information. More specifically, the present invention relates to a means and a method for forming predetermined patterns, or data structures, using materials exhibiting enhanced absorption.

BACKGROUND OF THE INVENTION

Storing information for retrieval is a fundamental need for many scientific and business systems. Computer memory on magnetic or other media, bar codes for product identification and pricing, compact discs for music recordings, and X-ray film for medical records, are but a few of the information storage and retrieval methods presently in use.

Several devices for information storage are known in the art wherein light from a source such as a laser is directed at a media, and the behavior of the light after interacting with the media reveals a data structure. For example, in a bar code reader, a laser is directed at a bar code comprising a series of reflecting and adsorbing regions. These reflecting and adsorbing regions are formed by the color of the bar code. The laser light is either reflected towards a sensor or absorbed by the bar code, depending on the particular portion of the bar code that is being interrogated. In this manner, data may be incorporated into the bar code by forming the bar code into predetermined patterns, whereby the width of the reflecting and adsorbing regions are assigned values. By interrogating the bar code with a light source and a detector capable of recognizing the pattern of the reflecting and adsorbing regions, the data structure formed by the pattern of the reflecting and adsorbing regions may be "read" by the detector.

Similarly, in compact disc technology, light from a source such as a laser is directed at a the compact disc, and the behavior of the light after interacting with the media reveals a data structure impressed on the disc. The data structure is impressed into the compact disc by forming the surface of the compact disc so that laser light directed at the compact disc is either reflected towards a detector or away from a detector, depending on the particular portion of the compact disc that is being interrogated. In this manner, a detector can detect or "read" the data structure impressed into the compact disc as the laser passes over the surface of the compact disc.

Both bar code technology and compact disc technology suffer from limitations on the density with which data may be imparted on them due to the physical constraints of the media and limitations associated with the wavelength and amplitude of the interrogating laser light. Electronic data storage media, such as magnetic tape, also suffer from limitations on the density with which data may be imparted onto the media due to the physical properties of the media. Also, the materials used in these types of data storage schemes suffer from drawbacks associated with the ability of the various media to withstand environmental damage.

Other optical interrogation methods utilize media which fluoresce upon interrogation with a light source, as opposed to conventional bar code and compact disc technology which simply redirects the interrogating light. In these schemes, the materials are interrogated by excitation from an energy source, typically a light source, which causes the materials to fluoresce. It is the light generated by the fluorescence of the materials, rather than a reflection of the interrogating light, which is then detected.

Several such fluorescing data storage media are described in U.S. Pat. No. 4,864,536, entitled "Optical Memory Method and System"; U.S. Pat. No. 4,915,982, entitled "Method of Making Thin Film Photoluminescent Articles"; U.S. Pat. No. 5,007,037 entitled "Optical Disk Drive System Utilizing Electron Trapping Media for Data Storage"; U.S. Pat. No. 5,142,493 entitled "Optical Disk Employing Electron Trapping Material as a Storage Medium"; and U.S. Pat. No. 5,163,039 entitled "Three-Dimensional Optical Memory System", all to Lindmayer and incorporated herein by reference. In the various apparatus described in the Lindmayer patents, a data structure is created by providing materials wherein stimulation of the materials with a charging light causes electrons in the valence band G to be excited to a communication band E whereupon the excited electrons then fall to a trapping level T. Patterns or data structures may thus be impressed, or written, into these materials by "writing" a data structure into the materials with a charging light source, such as a laser. The materials may then be interrogated by exposure to infrared light, which causes the electrons trapped in trapping level T to be excited to a communication band E, where they are able to combine with electron holes in the material to form electron hole pairs. At the formation of an electron hole pair, the electron is returned to the valence band G and light is emitted from the material. By detecting the emission of this resultant light, the data structure written into the Lindmayer devices is thus interrogated. However, in the Lindmayer devices, upon interrogation with an infrared light source, the data structure is partially or completely erased as the excited electrons in the electron trapping media are returned to the valence band G.

Accordingly, there exists a need for a high density information storage media capable of interrogation with a light source that is resistant to erasure of the data structure during interrogation.

SUMMARY OF THE INVENTION

The present invention is an interrogable information storage media and method of making and interrogating the media. Information is stored in the media by formation of data structures using "activated regions" of the media. More specifically, the present invention relates to a means and a method for forming predetermined patterns, or data structures, of "activated regions" of materials. "Activated regions," as used herein, refers to materials, or portions of materials, which exhibit enhanced absorption. Data structures are formed out of materials which exhibit the enhanced absorption or are formed in the portions of the materials which exhibit enhanced absorption.

For example, some materials exhibit enhanced absorption in their natural state, without treatment. In these materials, the entire material may be said to be an activated region and thus exhibits enhanced absorption. Materials which exhibit enhanced absorption without treatment are thus simply formed into patterns which then represent data structures.

Other materials do not exhibit enhanced absorption in their natural state but may be made to exhibit enhanced absorption by treating the materials. These materials are treated, or made to exhibit enhanced absorption, by exposing the materials to ionizing radiation. These materials may thus be formed into data structures either before or concurrent with the formation of regions exhibiting enhanced absorption within these materials. For example, the materials may be first subjected to ionizing radiation which converts the entire material into material exhibiting enhanced absorption. These materials are then formed into patterns in a manner identical to the formation of data structures using materials which exhibit enhanced absorption without treatment, and the treated materials are thus made to represent data structures.

Alternatively, the steps of forming activated regions in the materials by exposing the materials to ionizing radiation and forming data structures may be combined. In a combined approach, a data structure is formed in selected regions of a material by selectively exposing the material to a predetermined pattern of ionizing radiation, thereby forming activated regions only in the exposed portion of the materials. These activated regions thus correspond to the data structure. By selectively exposing portions of the materials to ionizing radiation in a predetermined pattern, the portions of the materials which are activated and the data structure are created simultaneously.

Data structures created by any of the foregoing methods may then be detected by interrogating the materials with light to differentiate enhanced absorption or activated regions from non-activated regions. The activated regions may be differentiated from the non-activated regions by observing the behavior of light directed at the activated regions. Light directed at the activated regions is more readily absorbed than light directed at the non-activated regions. Thus, to interrogate the data structures, light is directed at the materials and the absorption of the light is then measured by measuring the incident reflection of the light off of the material or transmission of the light through the material. Where light impacts an activated region, there is absorption of the light. For example, in LiF crystals treated with ionizing radiation a strong absorption band exists centered around 250 nanometers. Thus, by directing light with a wavelength band centered at approximately 250 nanometers, the treated regions are readily distinguishable from the non-treated regions by observing the absorption of the interrogating light. The absorption range is dependant on the particular material being interrogated, for most materials, absorption occurs between about 150 nanometers and about 1600 nanometers. By detecting the absorption of the light, the presence of the activated region, and thus the data structure is detected.

In some activated materials, the activated regions may also be distinguished from non-activated regions because in addition to the absorption of the interrogating light, the activated regions fluoresce. In these materials, by providing an interrogating light source having a first wavelength between about 400 nanometers and about 1000 nanometers, the activated regions absorb a portion of the interrogating light and are excited from a ground state to an excited state, whereupon the activated regions luminesce or release light at a second wavelength between about 600 nanometers and about 1600 nanometers when the activated regions return to the ground state. By detecting the fluorescence at the second wavelength, the presence of the activated regions, and hence the data structure, may be detected. Many materials are characterized by the property of absorbing light at specific wavelength bands, and upon absorption, fluorescing, or emitting light at a second wavelength. Of particular interest to the present invention are materials which will absorb light having a wavelength between about 400 nanometers and about 1000 nanometers, and which fluoresce or release light at a second wavelength between about 600 nanometers and about 1600 nanometers. Such materials would include certain crystalline materials including, but not limited to natural and artificial quartz, alumina, and Yttrium-Aluminum Garnet (YAG) doped with ions including, but not limited to $Nd^{3+}$, $Yb^{3+}$, $Ce^{3+}$, $Er^{3+}$, and $Tb^{3+}$. Each of the possible combinations of the doped crystalline materials will absorb light at a wavelength band specific to the particular material and dopant and will emit light, or fluoresce, at a second wavelength band, again specific to the particular material. Similarly, doped glasses including but not limited to silicates, phosphates, fluorophosphates, and fluoroberyllates doped with ions including, but not limited to, $Nd^{3+}$, $Yb^{3+}$, $Ce^{3+}$, $Er^{3+}$, and $Tb^{3+}$ will absorb light at a wavelength band specific to the particular doped glass and emit light, or fluoresce at a second wavelength band specific to the particular glass. One example of this behavior is Yttrium-Aluminum Garnet (YAG) doped with $Nd^{3+}$. This crystalline material will absorb light at a wavelength band between about 400 nanometers and about 830 nanometers, and fluoresce at a wavelength band between about 900 nanometers and about 1100 nanometers. As is the case with each of the doped crystals or glasses, the YAG host crystal may be optimized for maximum fluorescent output by varying the percentage of dopant present in the YAG host crystal. All of these materials may thus be formed into data structures in accordance with the present invention.

Other materials which do not inherently absorb light and fluoresce in this manner can be made to do so by exposing the materials to ionizing radiation. For example, crystalline materials including, but not limited to NaCl, NaF and LiF, will "activate" upon exposure to ionizing radiation. This phenomenon is described in U.S. Pat. No. 5,028,794 to Miller, incorporated herein by reference. These materials may be first activated by exposing the materials to ionizing radiation and then formed into data structures, or specific regions of these materials may be activated by selectively exposing portions of the materials to ionizing radiation, thereby allowing the data structures to be written into the materials simultaneously with the formation of the activated regions.

For example, materials such as sensitized aluminum oxide and lithium fluoride, as disclosed in U.S. patent application Ser. No. 08/534,769 filed Sep. 27, 1995 now U.S. Pat. No. 5,569,927 issued Oct. 29, 1996, and incorporated herein by reference, are activated and undergo a physical transformation when exposed to ionizing radiation. These materials, after having been activated by exposure to ionizing radiation, exhibit enhanced absorption. Thus, after having first been activated by exposure to ionizing radiation, the materials may then be shaped into a pattern representing a data structure. Virtually any method known in the art for forming patterns would be suitable, for example, the materials may be added to dyes or inks and printed into bar codes, illustrations, alpha-numeric writing, or any other desired pattern. Alternatively, the materials may be selectively exposed to ionizing radiation by processes known in the art including, but not limited to e-beam, ion beam or neutral particle beam lithography, thereby activating only a portion of the materials. The portion of the materials thus activated represents the desired data structure.

Under either approach, the data structure is then interrogated with a light source having a first wavelength, these materials will fluoresce and emit light having a peak intensity at a second wavelength. This phenomenon allows data structures to be encoded by forming patterns of these activated materials which can then be interrogated with light.

Also, the data structure may be formed in a composite material. The activated or activatable material is mixed with a host material to form a composite material. Materials suitable as host materials include, but are not limited to plastics, paints, polymers, adhesives, dyes, glass, fabrics, ceramics, stains, coatings, paper, inks and mixtures thereof. In this manner, a wide variety of paints, coatings, substrates and the like can be provided with activated or activatable materials in them. The data structures are then formed of the composite materials according to the present method.

In one embodiment of the present invention, an activatable material, either alone or mixed with a host material to form a composite material, may be selectively exposed to ionizing radiation, thereby forming a desired pattern of activated portions of the material. This method of forming patterns in a substrate may be accomplished by directing the ionizing radiation at specific locations on the material in a controlled manner, and thereby "writing" the data structure into the material. Devices suitable for writing data structures by directing ionizing radiation in such a controlled manner would include, but not be limited to, an electron beam, ion beam or a high energy neutral particle beam. Any source of ionizing radiation which can be effectively focused is suitable for this embodiment of the present invention.

Alternatively, a template which blocks ionizing radiation may be placed over an activatable material so that when the template and activatable material are exposed to ionizing radiation, the template blocks the ionizing radiation from some regions of the activatable material, thereby preventing activation, but allows the radiation to pass through other areas of the template, thereby allowing activation in a pattern dictated by the template. In this type of scheme, it is not necessary that the ionizing radiation be effectively focused, and thus any source of ionizing radiation is suitable.

In many applications, such as security or anti-counterfeiting applications, it may be desirable to disguise or camouflage the presence of these activated materials. For example, activated materials may be interspersed in a desired pattern with activatable, but non-activated, materials. These materials may be matched in color, opacity or appearance to camouflage the data structure. Similarly, the activated materials may be interspersed in a desired pattern with non-activatable materials. Again, these materials may be matched in color, opacity or appearance to camouflage the data structure. In addition to color matching, activated materials may be interspersed with materials having identical, or nearly identical, indexes of refraction to camouflage the presence of the activated materials and the data structures written onto such camouflaged activated materials.

In yet another embodiment of the present invention, different activatable materials or composites thereof which absorb and luminesce at different peak intensities may be layered or stacked as in a laminate. As previously indicated, data structures may be imparted into each of the laminate layers by any of the forgoing methods to form a multilayered data structure. In this manner, the data structures may be several layers deep, with each layer absorbing or luminescing at a unique wave length band.

Depth may also be imparted into the data structures by varying the energy of the ionizing radiation used to form the activated regions. For example, in a host crystal, the penetration depth of ionizing radiation is proportional to the kinetic energy of the particle imparting radiation damage. More energetic particles penetrate more deeply into materials and thus activate regions within the materials at greater depths. Therefore data structures may be written at several depths in a given material, and by focusing the interrogating light source to the specific desired depth, the data structure written at that depth may be interrogated separately from data imparted into the material at different depths. Interrogations at different depths may be in sequence or in parallel depending on the needs of the user.

As used herein, a "data structure" may be any pattern formed of an activatable material, including but not limited to patterns such as alpha-numeric writing, bar codes, illustrations, or binary displays wherein, by way of example, regions with activated material indicates a "one" and regions lacking activated material indicate a "zero." Also, as described in U.S. Pat. No. 5,028,794 to Miller, it is possible to vary the degree of activation and resultant absorption and luminescent response of the materials thereby allowing the regions having activated materials to indicate a variety of values depending on the strength of the effect of those activated regions on an interrogating light source. For example, in activated materials which fluoresce upon interrogation, the intensity of this fluorescent response may be varied by varying the intensity of the ionizing radiation and thus the degree of activation in the activatable materials. In a similar fashion the efficiency of absorption may be varied by varying the intensity of the ionizing radiation and thus the degree of absorption of light by the activatable materials. In this manner, a characteristic "grey scale" may be imparted to any particular region which has been activated. Thus, in addition to the formation data structures comprising patterns of activated materials, specific locations within these patterns may have further detail imparted by varying the grey scale of the specific locations.

To form grey scale in the activated materials at specific locations, the intensity of exposure to the ionizing radiation may be varied by varying either the duration of exposure, or by varying the intensity of the source of ionizing radiation, or both. In addition, grey scale, or the intensity of the absorption and/or response of a particular region of activated material, may also be varied by varying the concentration of the activated material at a specific location. Thus, data structures may be formed by the varying the intensity of response in different regions of activated materials either as a function of the intensity or duration of the ionizing radiation used to write on the materials, or by varying the concentration of activated materials in a particular location in the data structure, or both.

OBJECTS

Accordingly, it is an object of the invention to provide a method for encoding information wherein a data structure is formed of at least one activated material which absorbs light in a defined wavelength band.

It is a further object of the invention to provide a method for reading encoded information wherein a data structure within at least one activated material is exposed to an interrogating light containing wavelengths between about 400 nanometers and about 1000 nanometers, thereby causing the activated material to emit a signal light having a wavelength between about 600 nanometers and about 1600 nanometers.

It is thus a further object of the invention to form data structures, or predetermined patterns of activated materials.

It is yet a further object of the invention in one of its aspects to form the data structures by irradiating activatable materials with ionizing radiation.

It is yet a further object of the invention to camouflage the data structures by forming the data structures out of activated materials on a substrate having substantially the same color, opacity or appearance as the activated materials.

It is yet a further object of the invention to camouflage the data structures by forming the data structures out of activated materials on a substrate having substantially the same index of refraction as the activated materials.

It is yet a further object of the invention to form data structures comprised of, or augmented by, grey scale imparted to the activated materials by either varying the intensity of the ionizing radiation used to activate the activatable materials, varying the concentration of activated materials, or both, thereby providing a variation in the response of the activated materials to an interrogating light source.

It is yet a further object of the invention to vary the intensity of the response to an interrogating light source by varying the radiation exposure of the activatable material.

It is yet a further object of the invention to vary the depth of the data written into materials by varying the kinetic energy of ionizing radiation used to write data structures in the materials.

It is yet a further object of the invention to provide the activated material in a composite material containing material selected from the group consisting of plastics, paints, polymers, adhesives, dyes, glass, fabrics, ceramics, stains, coatings, paper, inks and mixtures thereof.

It is yet a further object of the invention to provide data structures constructed of activated material on a substrate.

It is yet a further object of the invention to provide data structures formed in laminate layers of different types of activated materials.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENTS

Figure 1:
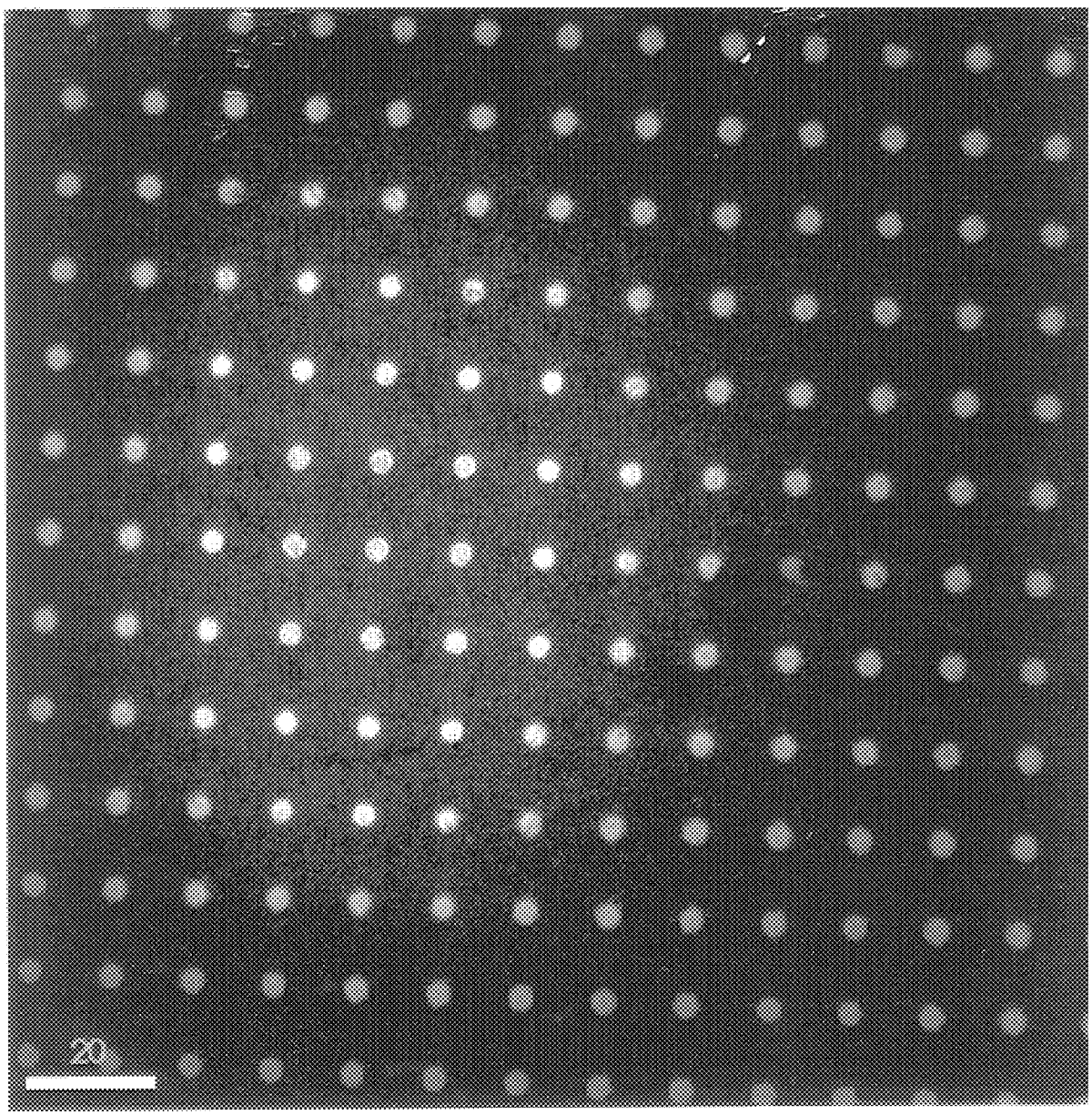
FIG. 1 is a printed image of a digital recording of a confocal microscope viewing the luminescent response of LiF crystals activated by electrons passing through 4 micron holes in a metal mask.

In a first preferred embodiment of the present invention, materials were treated with ionizing radiation and interrogated using the optically stimulated absorption (OSL) technique. The use of OSL and cold optically stimulated luminescence (COSL) technology has been described in several U.S. patents. U.S. Pat. No. 5,136,163 to Miller et al., incorporated herein by reference, describes a method of determining radiation exposure of a thermoluminescent material wherein the thermoluminescent material is first cooled and then optically stimulated by exposure to light. U.S. Pat. No. 5,025,159 to Miller et al., incorporated herein by reference, describes a method of determining radiation exposure of a thermoluminescent material wherein the thermoluminescent material is first cooled to a cryogenic temperature and then optically stimulated by exposure to ultraviolet light. U.S. Pat. No, 4,954,707 to Miller et al., incorporated herein by reference, describes a method of determining radiation exposure of a thermoluminescent material wherein the thermoluminescent material is first cooled by being brought into contact with a cryogenic substance such as liquid nitrogen and then optically stimulated by exposure to ultraviolet light. U.S. Pat. No. 5,272,348 to Miller et al., incorporated herein by reference, describes a method of determining radiation exposure of a crystalline material by exposing the crystalline material to optical radiation at a first wave length, which is greater than 540 nm, and measuring the optical energy emitted from the material at a second wavelength which is greater than the first wavelength. U.S. Pat. No. 5,354,997 to Miller et al., incorporated herein by reference, describes a method of determining radiation exposure of a crystalline material by exposing the crystalline material to optical radiation at a first wave length, which is greater than 540 nm, and measuring the optical energy emitted from the material at a second wavelength which is greater than the first wavelength.

In a second preferred embodiment of the present invention, data structures are formed of materials which, when interrogated with a light source having a first wavelength between about 400 nanometers and about 1000 nanometers, absorb a portion of the interrogating light and luminesce or release light at a second wavelength which is longer than the first wavelength and between about 600 nanometers and about 1600 nanometers. For example, Yttrium Aluminum Garnet (YAG) doped with $Nd^{3+}$ crystals may be ground into powders. These powders may then be formed into data structures or patterns including, but not limited to alpha-numeric writing, bar codes, illustrations, or binary displays. These patterns can then be interrogated by shining an interrogating light source having a first wavelength band ranging from about 400 nanometers to about 830 nanometers, and fluoresce at a wavelength band between about 900 nanometers and about 1100 nanometers.

In this manner the presence of the crystals in certain regions and absence of the crystals in other regions may be determined, allowing the exact contours of the data structure to be determined.

EXPERIMENT 1

A metal mask consisting of 4-micron holes was placed over an lithium fluoride (LiF) single crystal and uniformly irradiated using a 5-keV electron beam. The electron beam dose was approximately 12,500 nA-s/mm². This beam current and exposure was nearly optimum to produce the highest level of OSL intensity. A confocal microscope was used to image the crystal and record the spacial absorption pattern. The confocal microscope was equipped with an argon-ion laser that served as the excitation source. Since OSL is a fast fluorescent process, any discreet portion of the data structure need only be exposed to the interrogating light for approximately 50 nanoseconds to allow adequate response for detection. An optical filter was used to remove the scattered blue excitation light. Images digitally recorded by the confocal microscope were printed. FIG. 1 is a picture of the luminescent response of the LiF crystal tested in this experiment. The white spots in the photo are the regions of the LiF crystal activated by the electrons passing through the 4 micron holes in the metal mask.

The crystal was given a 60-hour heat treatment at 150° C. After heat treatment, the written areas were again imaged using the confocal microscope setup described above and showed no observable degradation.

EXPERIMENT 2

Figure 2:
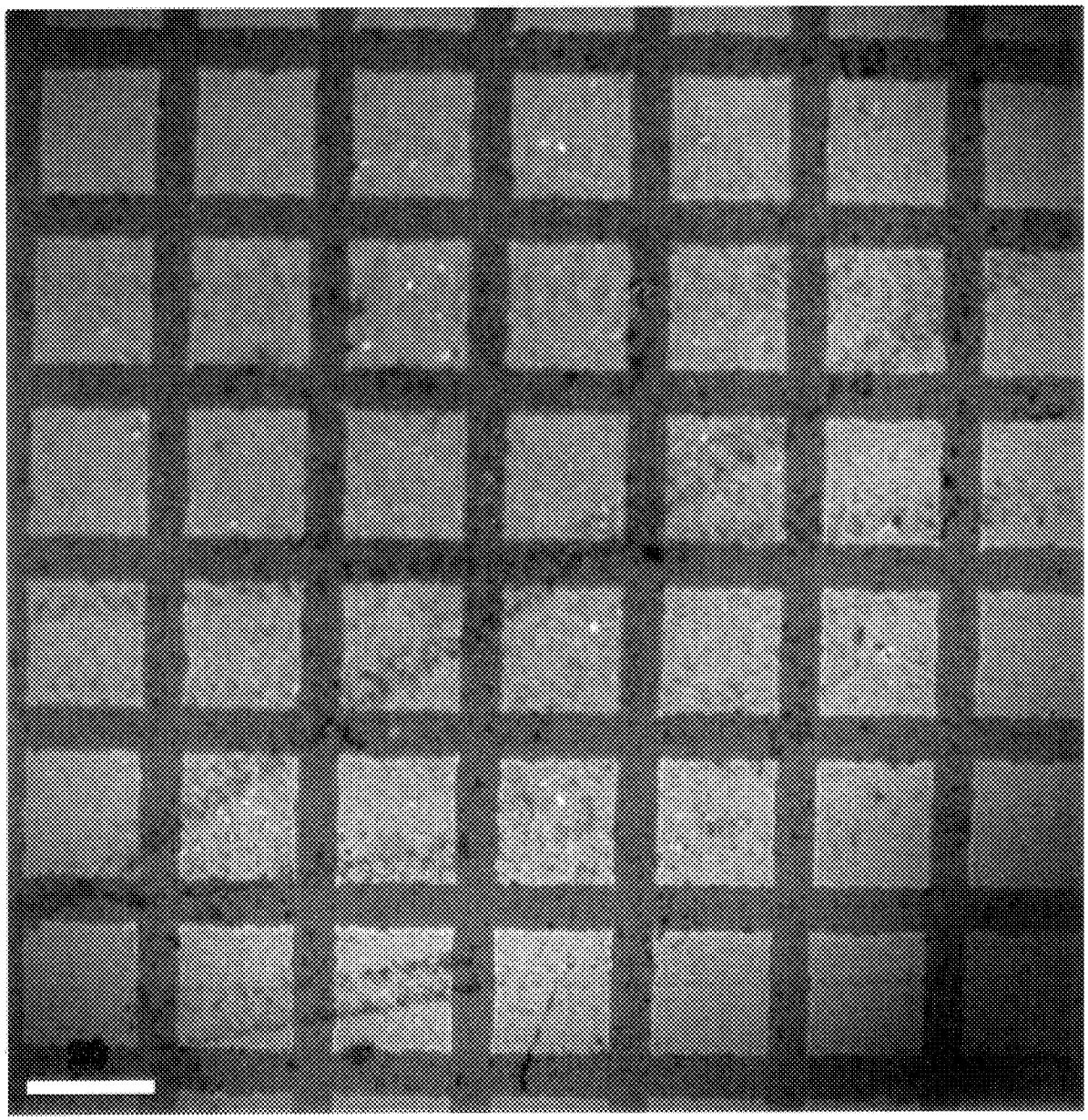
FIG. 2 is a printed image of a digital recording of a confocal microscope viewing the luminescent response of LiF crystals uniformly irradiated using a 5-keV electron beam passing through a metal screen having a thickness of approximately 4 microns.

A sample of LiF crystal was covered with a metal screen having a thickness of approximately 4 microns and uniformly irradiated using a 5-keV electron beam. The electron beam dose was approximately 12,500 nA-s/mm². A confocal microscope was equipped with an argon-ion laser that served as the excitation source was used to image the crystal and record the spacial absorption pattern. An optical filter was used to remove the scattered blue excitation light. Images digitally recorded by the confocal microscope were printed. FIG. 2 is a picture of the luminescent response of the LiF crystal tested in this experiment. The dark areas in the photo are the regions of the LiF crystal covered by the screen.

EXPERIMENT 3

Figure 3:
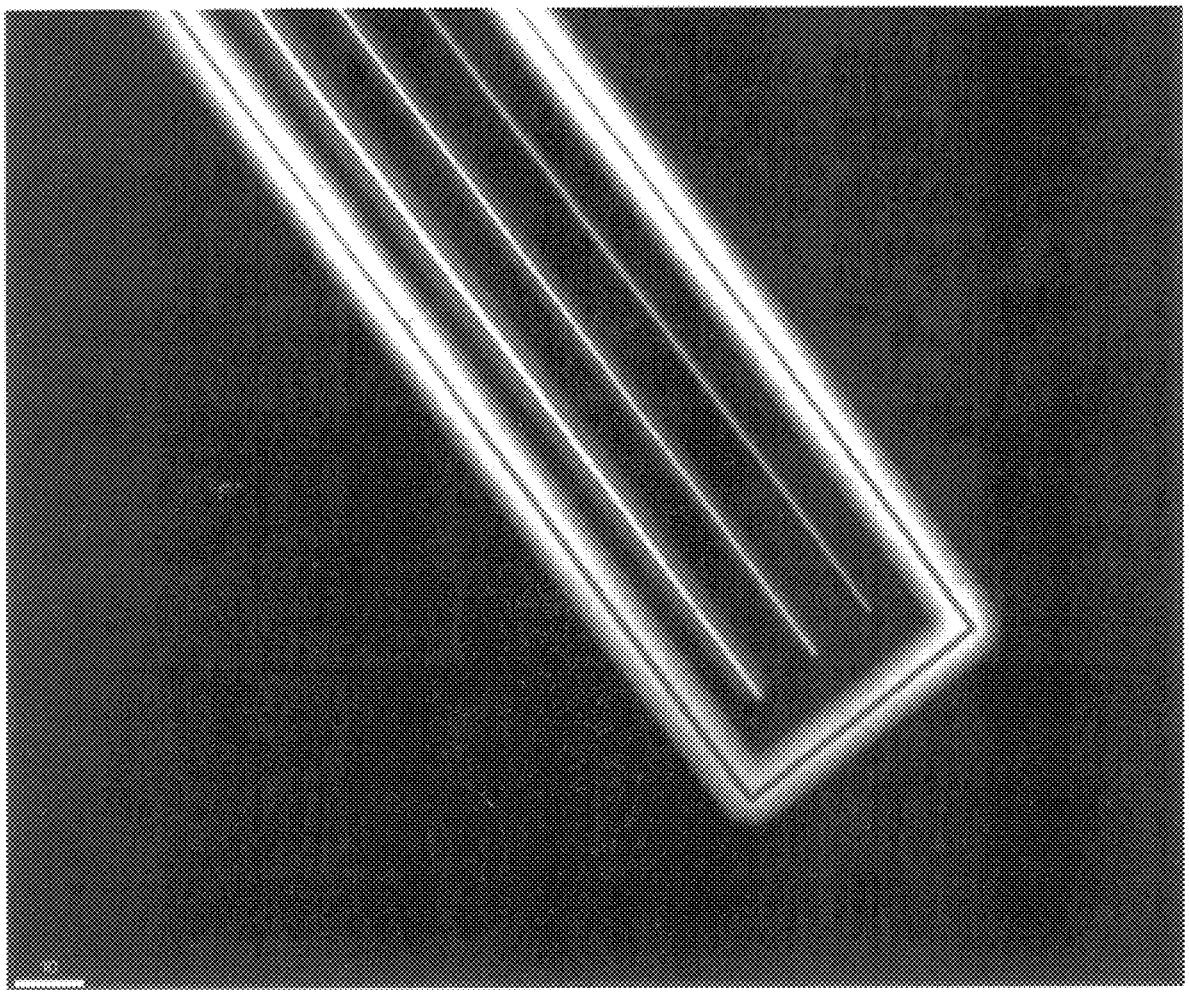
FIGS. 3 and 4 are printed images of digital recordings at different magnifications of a confocal microscope viewing pictures of the luminescent response of a LiF crystal exposed to an e-beam which wrote lines in the crystal at thicknesses of 100 nanometers, 250 nanometers and 500 nanometers.
Figure 4:
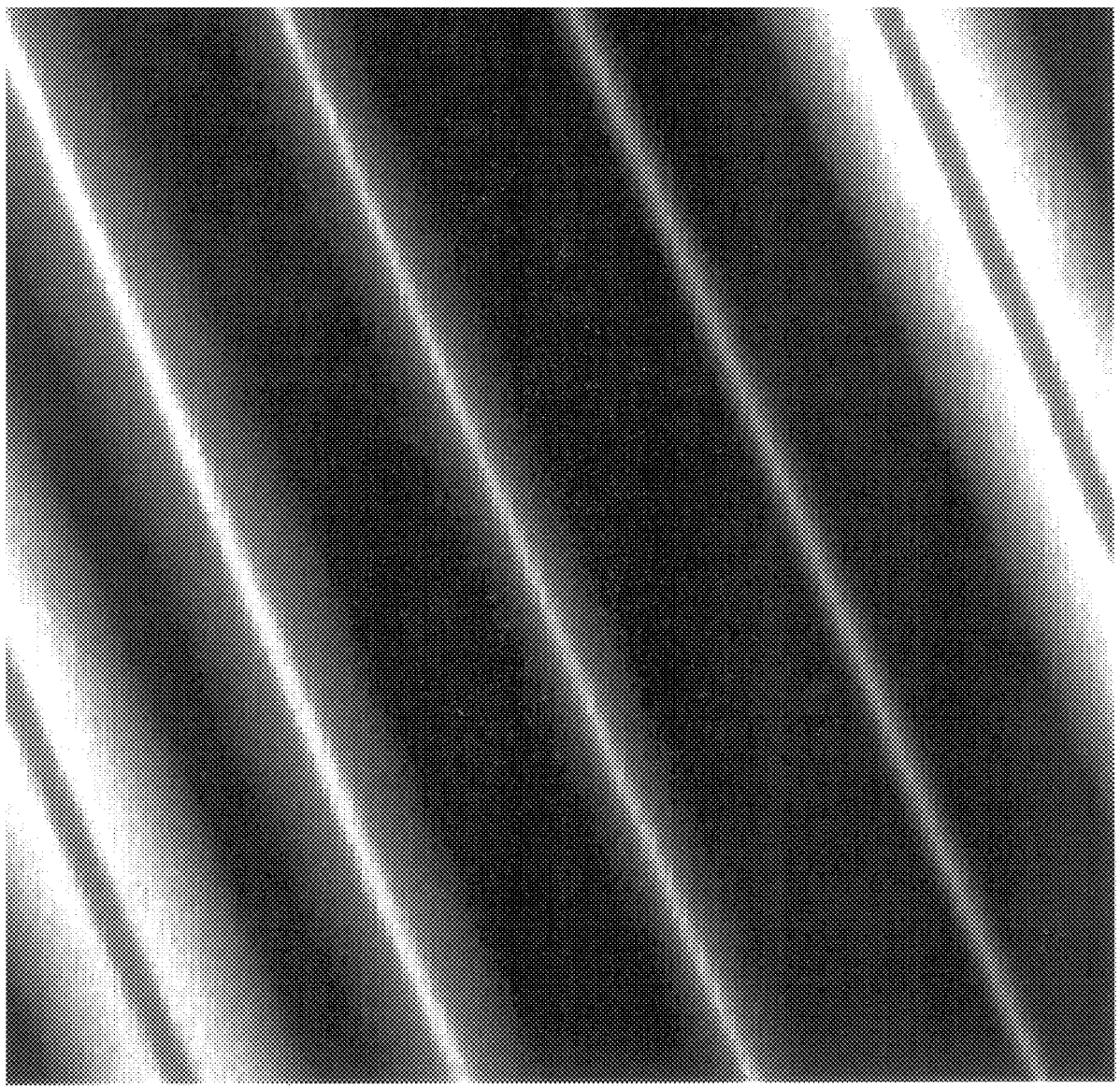

A sample of LiF crystal was irradiated using the E-beam lithography unit at the national nanofabrication facility in Santa Barbara, Calif. Three lines were "written" into the crystal with the e-beam and then interrogated with a confocal microscope equipped with an argon-ion laser serving as the excitation source. Again, an optical filter was used to remove the scattered blue excitation light. Images digitally recorded by the confocal microscope were printed. FIGS. 3 and 4 are pictures of the luminescent response of the LiF crystal tested in this experiment at different levels of magnification. As is shown by the photos, the e-beam wrote lines at thicknesses of 100 nanometers, 250 nanometers and 500 nanometers, all of which were readily observed using the confocal microscope. It should be noted that the confocal microscope used in this experiment had a resolution limit of 100 nanometers.

EXPERIMENT 4

Figure 5:
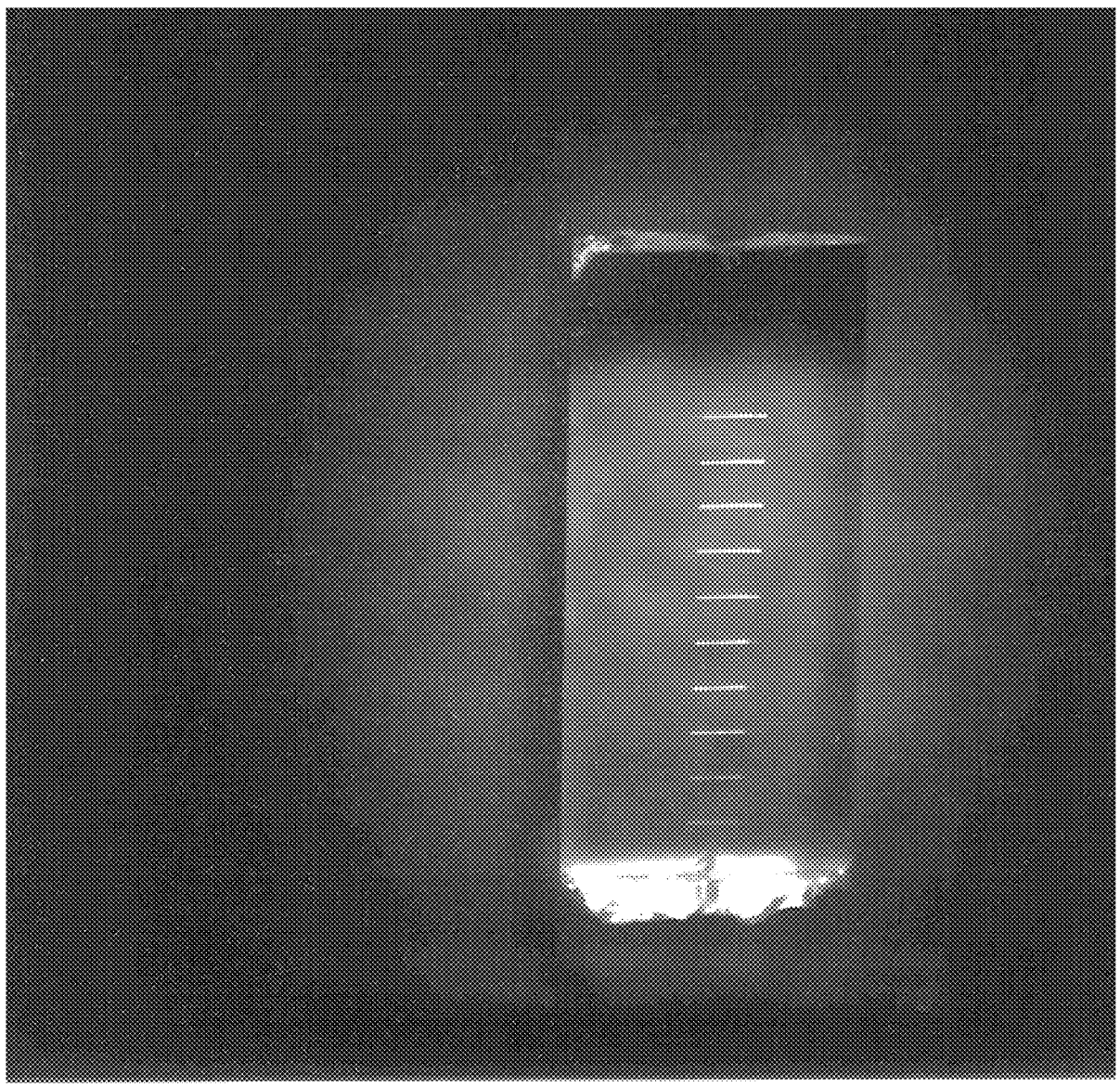
FIG. 5 is a printed image of a digital recording of a confocal microscope viewing the luminescent response of LiF crystals exposed to an e-beam at incremental increases in the current density demonstrating a corresponding increase in the luminescent response.
Figure 6:
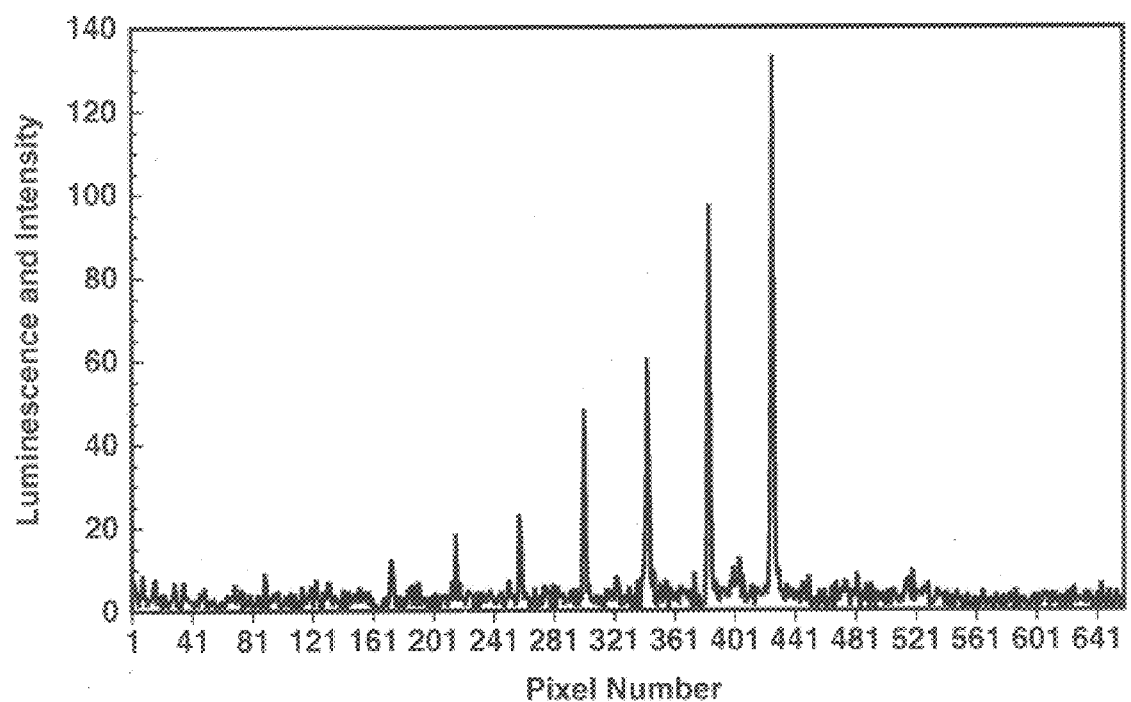
FIG. 6 is a graphical representation of the measured luminescent intensity of a line a single pixel across the LiF crystal imaged in FIG. 5.

An experiment was conducted on writing grey-scale information into the OSL storage medium and measuring the grey-scale at full bandwidth. A LiF crystal was exposed to an electron beam while incrementally increasing the current densities up to about 12,500 nA-s/mm². By increasing the current density, 4–5 grey-scales were written into a single crystal. A commercial, scientific grade CCD camera with a optical filter which blocked the blue excitation light and transmitted the red fluorescent light was used to capture the spacial intensities. The crystal was uniformly illuminated with blue light. As illustrated in FIG. 5, each incremental increase in the current density results in a corresponding increase in the luminescent response given a constant level of interrogating light. The image created by the CCD camera was analyzed using image analysis software which measured the luminescent intensity of a line a single pixel across. This response was graphed relative to its position as illustrated in FIG. 6.

EXPERIMENT 5

Figure 7:
FIG. 7 is a printed image of a CCD camera viewing the luminescent response of LiF crystals irradiated to $10^5$ rads using a Co 60 gamma source, ground to a powder having particles of less than 10 microns in diameter, mixed with a polymer based adhesive and printed on a substrate.

An experiment was conducted to demonstrate the ability to write data structures having alpha numeric patterns and bar codes in composite materials. LiF crystals irradiated to $10^5$ rads using a Co 60 gamma source and were ground to a powder having particles of less than 10 microns in diameter. This powder was then mixed with a polymer based adhesive and printed on a substrate. A He-Ne laser emitting light At 632 nanometers was used to uniformly interrogated the data structure. A scientific grade CCD camera equipped with an optical filter used to remove the scattered red excitation light. Images digitally recorded by the camera were printed. FIG. 7 is a picture of the luminescent response of the LiF crystal tested in this experiment. The light areas in the photo are the regions printed with the LiF crystal composite material.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An interrogable data structure comprising a plurality of regions of an activated material interspersed with a plurality of non-activated regions, said activated material formed into a predetermined pattern capable of absorbing a portion of an interrogating light containing a first wavelength between about 400 nanometers and about 1000 nanometers, and having a luminescent response at a second wavelength between about 600 nanometers and about 1600 nanometers.

2. The interrogable data structure of claim 1 wherein the activated regions are written at several depths.

3. The interrogable data structure of claim 2 wherein the regions of activated materials are formed by treating the regions with ionizing radiation.

4. The interrogable data structure of claim 2 wherein the activated regions are activated prior to pattern formation.

5. The interrogable data structure of claim 2 wherein the activated regions are activated simultaneous with pattern formation.

6. The interrogable data structure of claim 2 wherein the intensity of the luminescent response is varied by varying the radiation exposure of the regions of activated materials.

7. The interrogable data structure of claim 2 wherein the activated material is provided in a composite material.

8. The interrogable data structure of claim 7 wherein the composite material contains plastic.

9. The interrogable data structure of claim 7 wherein the composite is selected from the group consisting of paints, polymers, adhesives, dyes, glass, fabrics, ceramics, stains, coatings, paper, inks and mixtures thereof.

10. The interrogable data structure of claim 1 wherein the activated material is provided on a substrate.

11. The interrogable data structure of claim 1 wherein the activated material is provided on a substrate having substantially the same appearance as the activated material.

12. The interrogable data structure of claim 1 wherein the intensity of the luminescent response forms a grey scale.

13. The interrogable data structure of claim 1 wherein the intensity of the luminescent response is varied by varying the concentration of the activated material.

14. An interrogable data structure comprising an activatable material activated by exposure to ionizing radiation thereby rendering said activated material capable of absorbing a portion of an interrogating light, wherein said activatable material is formed into a predetermined pattern and the activated material is provided on a substrate having substantially the same appearance as the activated material.

15. An interrogable data structure comprising an activatable material activated by exposure to ionizing radiation thereby rendering said activated material capable of absorbing a portion of an interrogating light, wherein said activatable material is formed into a predetermined pattern and the activated material is provided on a substrate having substantially the same index of refraction as the activated material.

16. An interrogable data structure comprising an activatable material activated by exposure to ionizing radiation thereby rendering said activated material capable of absorbing a portion of an interrogating light, wherein said activatable material is formed into a predetermined pattern and the efficiency of light absorption in regions of the activated material is varied to form a grey scale.

17. The interrogable data structure of claim 16 wherein the efficiency of light absorbtion is varied by varying the concentration of the activated material.

18. The interrogable data structure of claim 16 wherein the efficiency of light absorbtion is varied by varying the radiation exposure of the regions of activated materials.

19. An interrogable data structure comprising an activatable material activated by exposure to ionizing radiation thereby rendering said activated material capable of absorbing a portion of an interrogating light, wherein said activatable material is formed into a predetermined pattern and the activated material is provided in a composite material.

20. The interrogable data structure of claim 19 wherein the composite material contains plastic.

21. The interrogable data structure of claim 19 wherein the composite is selected from the group consisting of paints, polymers, adhesives, dyes, glass, fabrics, ceramics, stains, coatings, paper, inks and mixtures thereof.

22. A method for creating an interrogable data structure comprising the steps of:
  a) providing an activatable material,
  b) exposing a region of said activatable material to ionizing radiation in a predetermined pattern thereby activating said region and forming said interrogable data structure in the activatable material capable of absorbing a portion of an interrogating light containing a first wavelength band between about 400 nanometers and about 1000 nanometers and having a luminescent response at a second wavelength band between about 600 nanometers and about 1600 nanometers.

23. The method of claim 22 wherein the activatable materials are provided on a substrate.

24. The method of claim 22 wherein the activatable materials are provided on a substrate having substantially the same appearance as the activatable materials.

25. The method of claim 22 wherein the intensity of the luminescent response at the second wavelength band is varied.

26. The method of claim 22 wherein the intensity of the luminescent response at the second wavelength band is varied by varying the concentration of the activated material.

27. The method of claim 22 wherein the intensity of the luminescent response at the second wavelength band is varied by varying the radiation exposure of the regions of activatable materials.

28. The method of claim 22 wherein the activated material is provided in a composite material.

29. The method of claim 28 wherein the composite material contains plastic.

30. The method of claim 28 wherein the composite material is selected from the group consisting of paints, polymers, adhesives, dyes, glass, fabrics, ceramics, stains, coatings, paper inks and mixtures thereof.

31. method for creating an interrogable data structure comprising the steps of:
  a) providing an activatable material capable of absorbing a portion of an interrogating light containing a first wavelength between about 400 nanometers and about 1000 nanometers, and having a luminescent response at a second wavelength between about 600 nanometers and about 1600 nanometers,
  b) forming said activatable material in a predetermined pattern thereby forming said interrogable data structure; and
  c) activating said activatable materials.

32. The method of claim 31 wherein the data structure is formed by providing regions of activatable materials interspersed with regions of non-activatable materials.

33. The method of claim 32 wherein the regions of activatable materials are activated by exposing the regions to ionizing radiation.

34. The method of claim 33 wherein the step of activating the regions is provided prior to forming the regions into predetermined patterns.

35. The method of claim 31 wherein the activatable materials are provided on a substrate.

36. The method of claim 31 wherein the activatable materials are provided on a substrate having substantially the same appearance as the activatable materials.

37. The method of claim 31 wherein the intensity of the luminescent response at the second wavelength band is varied.

38. The method of claim 31 wherein the-intensity of the luminescent response at the second wavelength band is varied by varying the concentration of the activated material.

39. The method of claim 31 wherein the intensity of the luminescent response at the second wavelength band is varied by varying the radiation exposure of the regions of activatable materials.

40. The method of claim 31 wherein the activatable material is provided in a composite material.

41. The method of claim 40 wherein the composite material contains plastic.

42. The method of claim 40 wherein the composite material is selected from the group consisting of paints, polymers, adhesives, dyes, glass, fabrics, ceramics, stains, coatings, paper, inks and mixtures thereof.

43. A method for creating an interrogable data structure comprising the steps of:
  a) providing a composite material containing an activated material capable of absorbing a portion of an interrogating light containing a first wavelength between about 400 nanometers and about 1000 nanometers, and having a luminescent response at a second wavelength between about 600 nanometers and about 1600 nanometers; and
  b) forming said activated material into a predetermined pattern thereby forming said interrogable data structure.

44. The method of claim 43 wherein the activated materials are provided on a substrate.

45. The method of claim 43 wherein the activated materials are provided on a substrate having substantially the same appearance as the activated materials.

46. The method of claim 43 wherein the activated material is interspersed within the composite material.

47. The method of claim 46 wherein the composite material contains plastic.

48. The method of claim 46 wherein the composite is selected from the group consisting of paints, polymers, adhesives, dyes, glass, fabrics, ceramics, stains, coatings, paper, inks and mixtures thereof.

49. A method for creating an interrogable data structure comprising the steps of:
   a) providing an activatable material provided in a composite material,
   b) exposing a region of said activatable material to ionizing radiation in a predetermined pattern thereby activating said region and forming said interrogable data structure in the activatable material capable of absorbing a portion of an interrogating light.

50. The method of claim 49 wherein the activatable materials are provided on a substrate.

51. The method of claim 49 wherein the activatable materials are provided on a substrate having substantially the same appearance as the activatable materials.

52. The method of claim 49 wherein the composite material contains plastic.

53. The method of claim 49 wherein the composite material is selected from the group consisting of paints, polymers, adhesives, dyes, glass, fabrics, ceramics, stains, coatings, paper, inks and mixtures thereof.

54. A method for creating an interrogable data structure comprising the steps of:
   a) providing an activatable material in a composite material, said activatable material capable of absorbing a portion of an interrogating light,
   b) forming said activatable material in a predetermined pattern thereby forming said interrogable data structure; and
   c) activating said plurality of regions of the activatable material.

55. The method of claim 54 wherein the activatable material is written at several depths.

56. The method of claim 54 wherein the regions of activatable materials are activated by exposing the regions to ionizing radiation.

57. The method of claim 54 wherein the step of activating the regions is provided prior to forming the regions into predetermined patterns.

58. The method of claim 54 wherein the activatable materials are provided on a substrate.

59. The method of claim 54 wherein the activatable materials are provided on a substrate having substantially the same appearance as the activatable materials.

60. The method of claim 54 wherein the activatable material is provided in a composite material.

61. The method of claim 60 wherein the composite material contains plastic.

62. The method of claim 60, wherein the composite material is selected from the group consisting of paints, polymers, adhesives, dyes, glass, fabrics, ceramics, stains, coatings, paper, inks and mixtures thereof.

63. A method for creating an interrogable data structure comprising the steps of:
   a) activating an activatable material provided in a composite material by exposing said activatable material to ionizing radiation thereby rendering said activated material capable of absorbing a portion of an interrogating light,
   b) forming said activated material into a predetermined pattern thereby forming said interrogable data structure.

64. The method of claim 63 wherein the activated materials are provided on a substrate.

65. The method of claim 63 wherein the activated materials are provided on a substrate having substantially the same appearance as the activated materials.

66. The method of claim 63 wherein the composite material contains plastic.

67. The method of claim 63 wherein the composite is selected from the group consisting of paints, polymers, adhesives, dyes, glass, fabrics, ceramics, stains, coatings, paper, inks and mixtures thereof.

* * * * *